(12) United States Patent
Aciicmez et al.

(10) Patent No.: US 7,936,871 B2
(45) Date of Patent: May 3, 2011

(54) ALTERING THE SIZE OF WINDOWS IN PUBLIC KEY CRYPTOGRAPHIC COMPUTATIONS

(75) Inventors: Onur Aciicmez, San Jose, CA (US); Jean-Pierre Seifert, Tirol (AT); Xinwen Zhang, Milpitas, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 910 days.

(21) Appl. No.: 11/849,765

(22) Filed: Sep. 4, 2007

(65) Prior Publication Data

US 2009/0003607 A1 Jan. 1, 2009

Related U.S. Application Data

(60) Provisional application No. 60/946,907, filed on Jun. 28, 2007.

(51) Int. Cl.
  *H04K 1/00* (2006.01)
  *H04L 9/00* (2006.01)
  *H04L 9/30* (2006.01)
  *H04L 12/58* (2006.01)
  *H04L 9/08* (2006.01)
  *G06F 15/00* (2006.01)
  *G06F 13/00* (2006.01)
  *G09C 1/00* (2006.01)

(52) U.S. Cl. ............... 380/30; 380/28; 380/44; 380/277

(58) Field of Classification Search .................... 380/30, 380/28, 44, 277
See application file for complete search history.

(56) References Cited

U.S. PATENT DOCUMENTS

| 5,991,415 | A | 11/1999 | Shamir | |
|---|---|---|---|---|
| 6,282,290 | B1 * | 8/2001 | Powell et al. | 380/28 |
| 6,304,658 | B1 | 10/2001 | Kocher et al. | |
| 6,327,661 | B1 | 12/2001 | Kocher et al. | |
| 6,804,782 | B1 | 10/2004 | Qiu et al. | |
| 7,000,111 | B1 | 2/2006 | Dent et al. | |
| 2003/0072442 | A1 * | 4/2003 | Blakley et al. | 380/28 |

FOREIGN PATENT DOCUMENTS

EP 887967 A1 * 12/1998

OTHER PUBLICATIONS

Andrea Pellegrini, Valeria Bertacco, Todd Austin; "Fault-based attack of RSA authentication", Mar. 2010, Date '10: Proceedings of the Conference on Design, Automation and Test in Europe, pp. 855-860.*

(Continued)

*Primary Examiner* — Matthew B Smithers
*Assistant Examiner* — Courtney D Fields
(74) *Attorney, Agent, or Firm* — Beyer Law Group LLP

(57) ABSTRACT

In one embodiment, cryptographic transformation of a message is performed by first performing a table initiation phase. Then an exponentiation phase is performed, wherein the exponentiation phase includes two or more parsing steps, wherein each of the parsing steps includes parsing a part of a cryptographic key into a window of size n, wherein n is a difficult to predict number.

20 Claims, 2 Drawing Sheets

OTHER PUBLICATIONS

Werner Schindler, "A Combined Timing and Power Attack". In Proceedings of the 5$^{th}$ International Workshop on Practice and Theory in Public Key Cryptosystems: Public Key Cryptography (Feb. 12-14, 2002). D. Naccache and P. Paillier, Eds. Lecture Notes in Computer Science, vol. 2274, Springer-Verlag Berlin Heidelberg, pp. 263-279.

W. Schindler, C.D. Walter, "More Detail for Combined Timing and Power Attack Against Implementations of RSA". 9$^{th}$ IMA International Conference on Cryptography and Coding, K.G. Paterson, Editor, LNCS Nr. 2898, Springer-Verlag, Berlin Heidelberg, 2003, pp. 245-263.

C.D. Walter, S. Thompson. "Distinguishing Exponent Digits by Observing Modular Subtractions". D. Naccache (Ed.): CT-RSA 2001, LNCS 2020, Springer-Verlag, Berlin Heidelberg, 2001, pp. 192-207.

* cited by examiner

ALTERING THE SIZE OF WINDOWS IN PUBLIC KEY CRYPTOGRAPHIC COMPUTATIONS

CROSS-RELATION TO RELATED APPLICATION

This application claims priority to U.S. Provisional Patent Application No. 60/946,907, entitled "CHANGING THE SIZE OF THE WINDOWS IN RSA EXPONENTIATION", filed Jun. 28, 2007 by Onur Aciicmez, Jean-Pierre Seifert, and Xinwen Zhang.

BACKGROUND OF THE INVENTION

1. Field of the Invention

The present invention relates to public-key cryptosystems. More specifically, the present invention relates to altering the size of windows in public key cryptographic computations.

2. Description of the Related Art

In public-key cryptosystems, a user is given a pair of cryptographic keys—a public key and a private key. Each of these keys may have one or more values/parameters. The private key is kept secret, while the public key may be widely distributed. The keys are related mathematically, but the private key cannot be practically derived from the public key. A message encrypted with the public key can be decrypted only with the corresponding private key. Similarly, a message signed with a private key can be verified using the public key counterpart of this private key.

One of the most widely used types of public-key encryption is RSA. The main operation in RSA is modular exponentiation. For example, the exponentiation may be $P=M^d$ (mod N), wherein M is a message to be decrypted and/or signed, d is the private exponent, which is part of the private key, and N is the public modulus, which is part of the public key. N is usually the product of two large primes p and q, which are parts of the private key. If a malicious user obtains the value of d, he can impersonate the owner of the key and decipher encrypted messages. Other modular exponentiations, such as $M^d$ (mod p), where p is a prime number which is also a factor of the public modulus N may also be used.

Efficient RSA implementations typically use certain exponentiation algorithms which require computing the powers of the input message in a modulus. Then, during an exponentiation phase, these powers are used as operands to the modular operations.

One common technique used in RSA is Montgomery multiplication. Montgomery multiplication includes various modular functions along with a conditional subtraction step that depends on the values of the operands. This is known as an "extra reduction" step. Due to the presence of this extra reduction step, however, it may be possible for statistical analysis to be used to deduce the value of the exponent(s). This leaves software that utilizes RSA implementations vulnerable to attack.

What is needed is a solution that reduces this security risk.

SUMMARY OF THE INVENTION

In one embodiment, cryptographic transformation of a message is performed by first performing a table initiation phase. Then an exponentiation phase is performed, wherein the exponentiation phase includes two or more parsing steps, wherein each of the parsing steps includes parsing a part of a cryptographic key into a window of size n, wherein n is a difficult to predict number.

DETAILED DESCRIPTION OF SPECIFIC EMBODIMENTS

Figure 1:
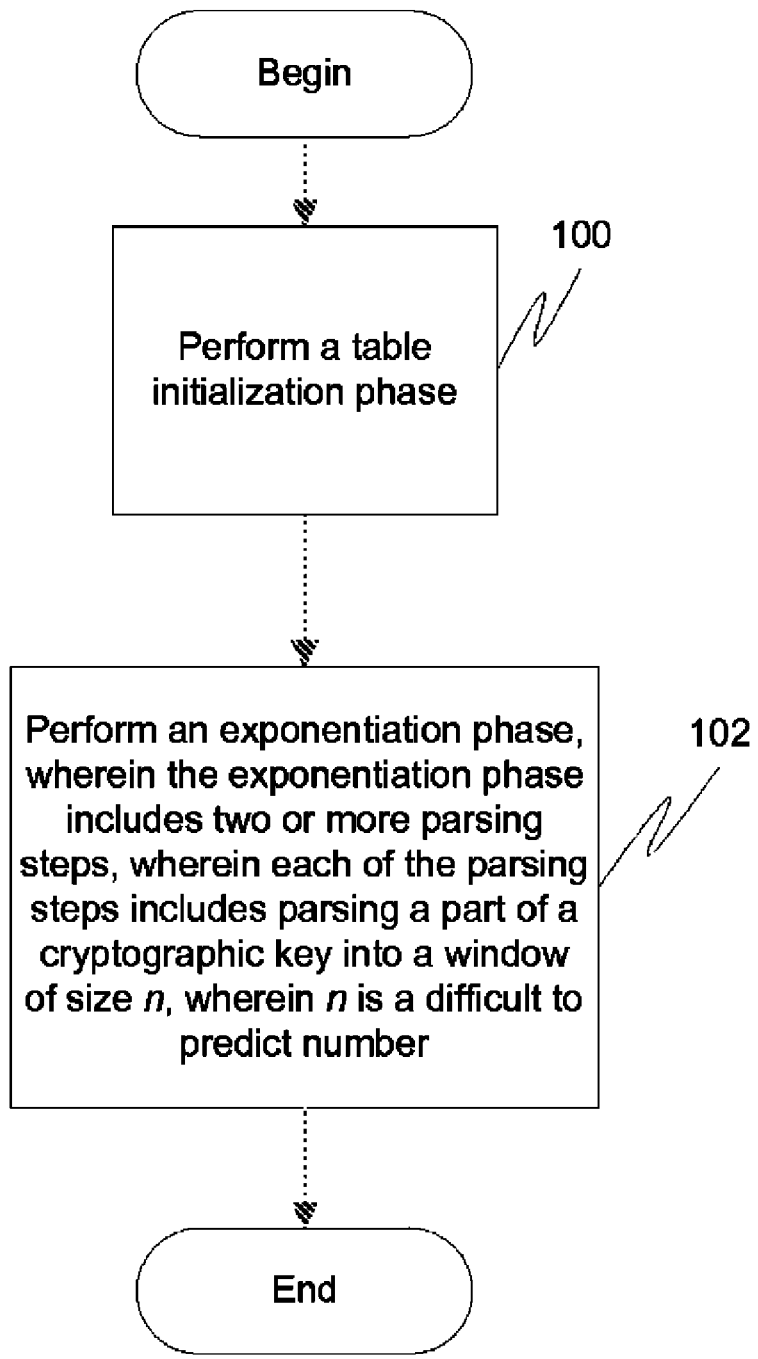
FIG. 1 is a diagram illustrating a method for performing a cryptographic transformation of a message in accordance with an embodiment of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Given the inputs M, d, and N (representing the message, exponent, and modulus, respectively), a typical RSA implementation typically performs the modular exponentiation ($M^d$ mod N) in the following way:

1. Table Initialization Phase

In this phase, the powers of M are computed in mod N and the results stored in a table. More precisely, the following computations are performed:

$$e=(M \bmod N), e_2=(M^2 \bmod N), e_3=(M^3 \bmod N), \ldots, e_t=(M^t \bmod N)$$

where the value of t depends on the exact exponentiation process used in the implementation.

2. Exponentiation Phase

In this phase, the exponent d is parsed into small windows and a sequence of modular multiplication and square operations is performed based on the values of these windows.

The RSA implementation of OpenSSL, which is the most widely used open source cryptographic library, employs two different exponentiation algorithms depending on the user choice: sliding window and fixed window. In the fixed window exponentiation method, the n-bit exponent d is considered to be in radix-$2^b$ form, i.e., $d=(d_0, d_1, \ldots, d_{k-1})2^b$, where $n=k*b$. For purposes of illustration, an example of the present invention using a fixed window implementation will be described. However, one of ordinary skill in the art will recognize that the present invention may be implemented using any type of exponentiation process and/or public key cryptosystem implementation.

Below is example pseudocode for a fixed window exponentiation method.

$e_1 = M$
for    i from 2 to $2^b - 1$
     $e_i = e_{i-1} * M \pmod{N}$
$S = e_{d_0}$
for    i from 1 to $k - 1$
     $S = S^{2^b} \pmod{N}$
     if $d_i \neq 0$ then
         $S = S * e_{d_i} \pmod{N}$
return S Sliding window exponentiation is similar to fixed window, except for a slight modification. In fixed window, the exponent d is split into consecutive windows of b consecutive bits. The number of multiplications can be further reduced by splitting d into odd windows of at most b consecutive bits, where the windows are not necessarily consecutive and may be separated by zero bits, Here, d is considered to be in radix-2 form, i.e., $d = (d_{n-1}, d_{n-2}, \ldots, d_0)_2$. Below is example pseudocode for a sliding window exponentiation method.

$e_1 = M, e_2 = M^2 \pmod{N}$
for    i from 1 to $2^{b-1} - 1$
     $e_{2i+1} = e_{2i-1} * e_2 \pmod{N}$
$S = 1, i = n - 1$
while $i \geq 0$ do
     if    $d_i = 0$ then
         $S = S * S \pmod{N}$
         $i = i - 1$
     else find the minimum t such that
         $i - t + 1 \leq b, t \geq 0$, and $d_t = 1$
     $l = (d_{i \ldots i} d_t)_2$
     $S = S^{2^{i-t+1}} * e_l \pmod{N}$
     $i = t - 1$
return S In an embodiment of the present invention, the window size is dynamically changed during the exponentiation phase. This embodiment is therefore different than both fixed window and sliding window implementations.

For example, consider d as in radix-2 form like in the sliding window exponentiation example, i.e., $d = (d_{n-1}, d_{n-2}, \ldots, d_0)_2$.

During an exponent scanning step, a difficult to predict (e.g., random) number may be used to determine the size of the window. Then the system may scan only that many bits of the exponent and perform the iteration of the loop. Below is example pseudocode according to this embodiment.

$e_0 = 1$
$e_1 = M$
for i from 2 to $2^b - 1$
     $e_i = e_{i-1} * M \pmod{N}$
$S = 1$
while $i \geq 0$ do
     wsize = a difficult to predict number less than b
     wvalue = $(d_i, \ldots, d_{i-wsize+1})_2$
     $S = S^{2^{wsize}} \pmod{N}$
     $S = S * e_{wvalue} \pmod{N}$
     $i = i - wsize$
return S Furthermore, there are several optimizations that can be used to decrease the execution time of various embodiment of the present invention. For example, the difficult to predict numbers can be generated and stored in an array in advance and this array can be read during the exponentiation.

Additionally, it is also possible to split the exponents into multiple parts and to perform right-to-left and left-to-right exponentiations on different parts. This allows for an even higher level of security. For example, the exponents may be split into at least one part on which right-to-left scanning is performed in order to perform the exponentiation phase as well as into at least one other part on which left-to-right scanning is performed in order to perform the exponentiation phase.

Difficult to predict shall be interpreted to mean a random, pseudo-random, or other number that one of ordinary skill in the art would find difficult to predict. The purpose of this number is so that a would-be interceptor of the message would find it difficult to perform the cryptographic transformation. As such, the goal is to make the window size difficult for this would-be interceptor to predict, and the difficulty required to predict such a window size shall be measured by the level of an interceptor of ordinary skill.

FIG. 1 is a flow diagram illustrating a method for performing a cryptographic transformation of a message in accordance with an embodiment of the present invention. In some embodiments of this method, the implementation details described above may be utilized. At 100, a table initiation phase is performed. At 102, an exponentiation phase is performed, wherein the exponentiation phase includes two or more parsing steps, wherein each of the parsing steps includes parsing a part of a cryptographic key into a window of size n, wherein n is a difficult to predict number. In one embodiment the difficult to predict number is changed for each of the parsing steps, but other embodiments are foreseen where the difficult to predict number is maintained for more than one parsing step before changing. The window size n may be further changed between successive executions of the exponentiation phase.

Figure 2:
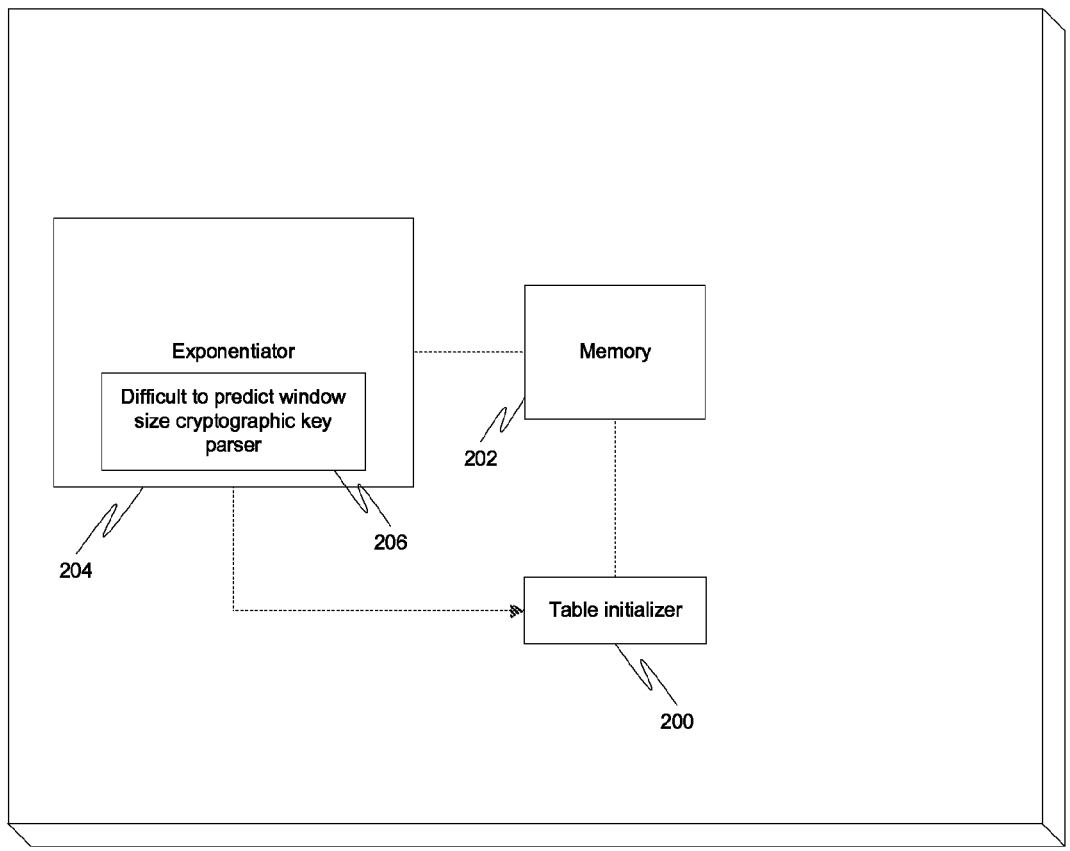
FIG. 2 is a diagram illustrating an apparatus for performing a cryptographic transformation of a message in accordance with an embodiment of the present invention.

FIG. 2 is a block diagram illustrating an apparatus for performing a cryptographic transformation of a message in accordance with an embodiment of the present invention. In some embodiments of this method, the implementation details described above may be utilized. A table initializer 200 coupled to a memory 202 may perform a table initiation phase. An exponentiator 204 coupled to the memory 202 may perform an exponentiation phase, wherein the exponentiation phase includes two or more parsing steps, wherein each of the parsing steps includes using a difficult to predict window size cryptographic key parser 206 to parse a part of a cryptographic key into a window of size n, wherein n is a difficult to predict number that is changed for each of the parsing steps. The window size n may be further changed between successive executions of the exponentiation phase.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method for performing a cryptographic transformation of a message, the computer implemented method comprising:
    performing, using a processor, a table initiation phase; and
    performing, using a processor, an exponentiation phase raising a message to the power of an exponent, wherein the exponentiation phase includes two or more parsing steps, wherein each of the parsing steps includes parsing a part of a cryptographic key into a window of size n, wherein n is a difficult to predict number dynamically changed during the exponentiation phase.

2. The computer-implemented method of claim 1, wherein n is a random number.

3. The computer-implemented method of claim 1, further comprising:
    computer code for splitting a cryptographic key into a plurality of parts;
    computer code for performing the exponentiation phase on at least one of the plurality of parts by scanning said at least one of the plurality of parts from left to right; and
    computer code for performing the exponentiation phase on at least one other of the plurality of parts by scanning said at least one other of the plurality of parts from right to left.

4. The computer-implemented method of claim 1, further comprising computer code for performing a step from the group consisting of:
    displaying the message on a display;
    displaying an end result of and/or an intermediate result calculated during the method on a display; and
    passing an end result of and/or an intermediate result calculated during the method to an application.

5. The computer-implemented method of claim 1, wherein the message is a combination of at least one of the following:
    a textual message;
    a numerical value;
    a portion of a binary file;
    an ordered sequence of bits;
    a portion of a video;
    a portion of an audio file; and
    a digital certificate.

6. The computer-implemented method of claim 1, further comprising:
    computer code for reducing the result of the exponentiation phase in modulo of a part of a key.

7. The computer-implemented method of claim 2, wherein the difficult to predict number is a substantially random number.

8. The computer-implemented method of claim 1, wherein n is different in a first of the two or more parsing steps than in a second of the two or more parsing steps.

9. An apparatus for performing a cryptographic transformation of a message, the apparatus comprising:
    a memory;
    a table initializer;
    an exponentiator configured to perform an exponentiation phase raising the message to the power of an exponent, wherein the exponentiation phase includes two or more parsing steps, wherein the exponentiator includes a difficult to predict window size cryptographic key parser configured to parse a part of a cryptographic key into a window of size n, wherein n is dynamically changed during the exponentiation phase.

10. The apparatus of claim 9, further comprising:
    an exponentiation result reducer coupled to the memory.

11. An apparatus for performing a cryptographic transformation of a message, the apparatus comprising:
    means for performing a table initiation phase;
    means for performing an exponentiation phase raising the message to the power of the exponent, wherein the exponentiation phase includes two or more parsing steps, wherein each of the parsing steps includes parsing a part of a cryptographic key into a window of size n, wherein n is dynamically changed during the exponentiation phase.

12. The apparatus of claim 11, wherein n is further changed between successive executions of the exponentiation phase.

13. The apparatus of claim 11, further comprising:
    means for splitting a cryptographic key into a plurality of parts;
    means for performing the exponentiation phase on at least one of the plurality of parts by scanning said at least one of the plurality of parts from left to right; and
    means for performing the exponentiation phase on at least one other of the plurality of parts by scanning said at least one other of the plurality of parts from right to left.

14. The apparatus of claim 11, further comprising means for performing a step from the group consisting of:
    displaying the message on a display;
    displaying an end result of and/or an intermediate result calculated during the method on a display; and
    passing an end result of and/or an intermediate result calculated during the method to an application.

15. The apparatus of claim 11, wherein the message is a combination of at least one of the following:
    a textual message;
    a numerical value;
    a portion of a binary file;
    an ordered sequence of bits;
    a portion of a video;
    a portion of an audio file; and
    a digital certificate.

16. The apparatus of claim 11, further comprising:
    means for reducing the result of the exponentiation phase in modulo of a part of a key.

17. The apparatus of claim 11, wherein n is a substantially random number.

18. The apparatus of claim 11, wherein n is different in a first of the two or more parsing steps than in a second of the two or more parsing steps.

19. A non-transitory program storage device readable by a machine tangibly embodying a program of instructions executable by the machine to perform a method for performing a cryptographic transformation of a message, the method comprising:
    performing a table initiation phase;
    performing an exponentiation phase raising a message to the power of an exponent, wherein the exponentiation phase includes two or more parsing steps, wherein each of the parsing steps includes parsing a part of a cryptographic key into a window of size n, wherein n is dynamically changed during the exponentiation phase.

20. The method of claim 1, wherein a first of the two or more parsing steps is performed during a left-to-right scanning of the exponent and the second of the two or more parsing steps is performed during a right-to-left scanning of the exponent.

* * * * *